United States Patent [19]

Spies et al.

[11] Patent Number: 5,104,032
[45] Date of Patent: Apr. 14, 1992

[54] WELDED LAP OR WEB JOINT FOR GALVANIZED SHEETS

[75] Inventors: Berard Spies, Sindelfingen; Volker Thoms, Hirsau, both of Fed. Rep. of Germany

[73] Assignee: Mercedes-Benz AG, Fed. Rep. of Germany

[21] Appl. No.: 591,947

[22] Filed: Oct. 2, 1990

[30] Foreign Application Priority Data

Oct. 6, 1989 [DE] Fed. Rep. of Germany ....... 3933408

[51] Int. Cl.$^5$ .............................................. B23K 26/00
[52] U.S. Cl. .................. 228/173.6; 228/203; 219/121.64; 403/271
[58] Field of Search .................. 228/173.1, 173.6, 189, 228/203; 219/121.63, 121.64; 403/271

[56] References Cited

U.S. PATENT DOCUMENTS

| | | | |
|---|---|---|---|
| 3,969,604 | 7/1976 | Baardson | 219/121.64 |
| 4,682,002 | 7/1987 | Delle Piane et al. | 219/121.64 |
| 4,745,257 | 5/1988 | Rito et al. | 219/121.64 |

FOREIGN PATENT DOCUMENTS

| | | | |
|---|---|---|---|
| 3820848 | 4/1989 | Fed. Rep. of Germany . | |
| 3812448 | 6/1989 | Fed. Rep. of Germany | 403/271 |
| 2600923 | 1/1988 | France | 219/121.64 |
| 56-62688 | 5/1981 | Japan | 219/121.64 |
| 60-255294 | 12/1985 | Japan . | |

*Primary Examiner*—Samuel M. Heinrich
*Attorney, Agent, or Firm*—Evenson, Wands, Edwards, Lenahan & McKeown

[57] ABSTRACT

A welded lap or web joint for galvanized sheets, having a laser weld orientated transversely to the overlapped sheets and penetrating through the sheet layers. The sheet layers are held at a distance by protrusions or beads which are integrated, in such a way as to run next to the laser weld, in at least one of the sheets are pressed into it.

4 Claims, 2 Drawing Sheets

WELDED LAP OR WEB JOINT FOR GALVANIZED SHEETS

BACKGROUND AND SUMMARY OF THE INVENTION

The invention relates to a welded lap or web joint for galvanized sheets of the generic type disclosed, for example, by JP-56-62-688(A).

In JP-56-62 688 (A), in order to avoid gas pockets of the zinc coating in the weld pool, which zinc coating vaporizes during welding, inserts which ensure the distancing of the sheets are adhesively bonded between the sheets in the overlap region on either side of the laser weld. These protrusion-like inserts run parallel to the longitudinal direction of the laser weld and are at a mutual transverse distance apart which is greater than the width of the weld. Consequently, during welding there are two large-area alignment channels, directed transversely to the longitudinal direction of the laser weld, for the vaporizing zinc. Although this method proves to be reliable with regard to its function, it is too time-consuming and costly for production, since an additional material has to be arranged between the sheets. Furthermore, in the specification defining the generic type, a further example is cited in which, in the overlap region, a longitudinal bead following the course of the weld and having a trapezoidal cross-section is pressed into one of the sheets, which longitudinal bead, with the mating sheet, forms a longitudinal channel, following the course of the weld, for the zinc vapor. In such an arrangement, however, considerable flow resistance which impairs the drainage action may possibly result.

The object of the present invention is therefore to provide a welded lap or web joint such that galvanized sheets can be welded more cost-effectively.

This and other and other objects are achieved according to the invention by protrusions or beads pressed into the sheet. When the sheets are clamped against one another, these beads ensure the spacing of the sheet layers in the overlap region, and thus the short alignment channels running in two directions transversely to the laser weld.

Other objects, advantages and novel features of the present invention will become apparent from the following detailed description of the invention when considered in conjunction with the accompanying drawings.

DETAILED DESCRIPTION OF THE DRAWINGS

Figure 1:
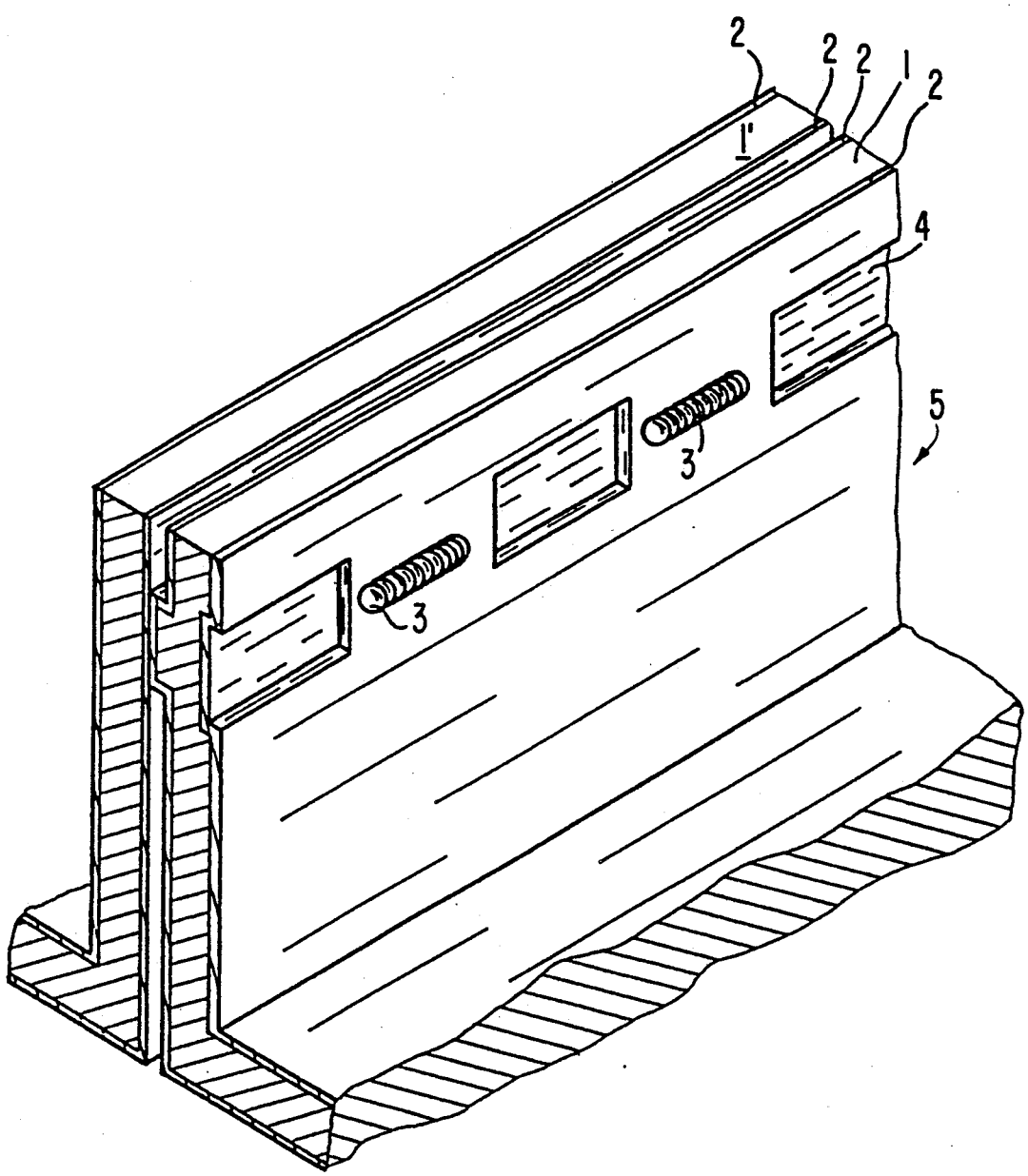
FIG. 1 shows a laser weld between the protrusions along the same straight line.

FIG. 1 shows two galvanized sheets 1, 1' which are bent at right-angles at one of their margins and, in this region, which forms the overlapped region 5, are brought into closer proximity to one another, and are then welded to one another. One sheet 1 has a series of projections 4 which are arranged along a straight line and are pressed out of the said sheet 1 in a defined manner in the direction of the other sheet 1'. In this way, they are arranged between the sheets 1, 1' in the overlap region 5 in such a way as to ensure the distancing of the sheets. Laser welds 3 are made in the regions between the protrusions 4 along the straight line, which laser welds 3 likewise extend along this straight line. The laser welds 3 are at a distance from the projections 4, as a result of which short air channels, running in two spatial directions, are always available for the zinc, vaporizing during welding, of the coating 2 of the sheets 1, 1'.

Figure 2:
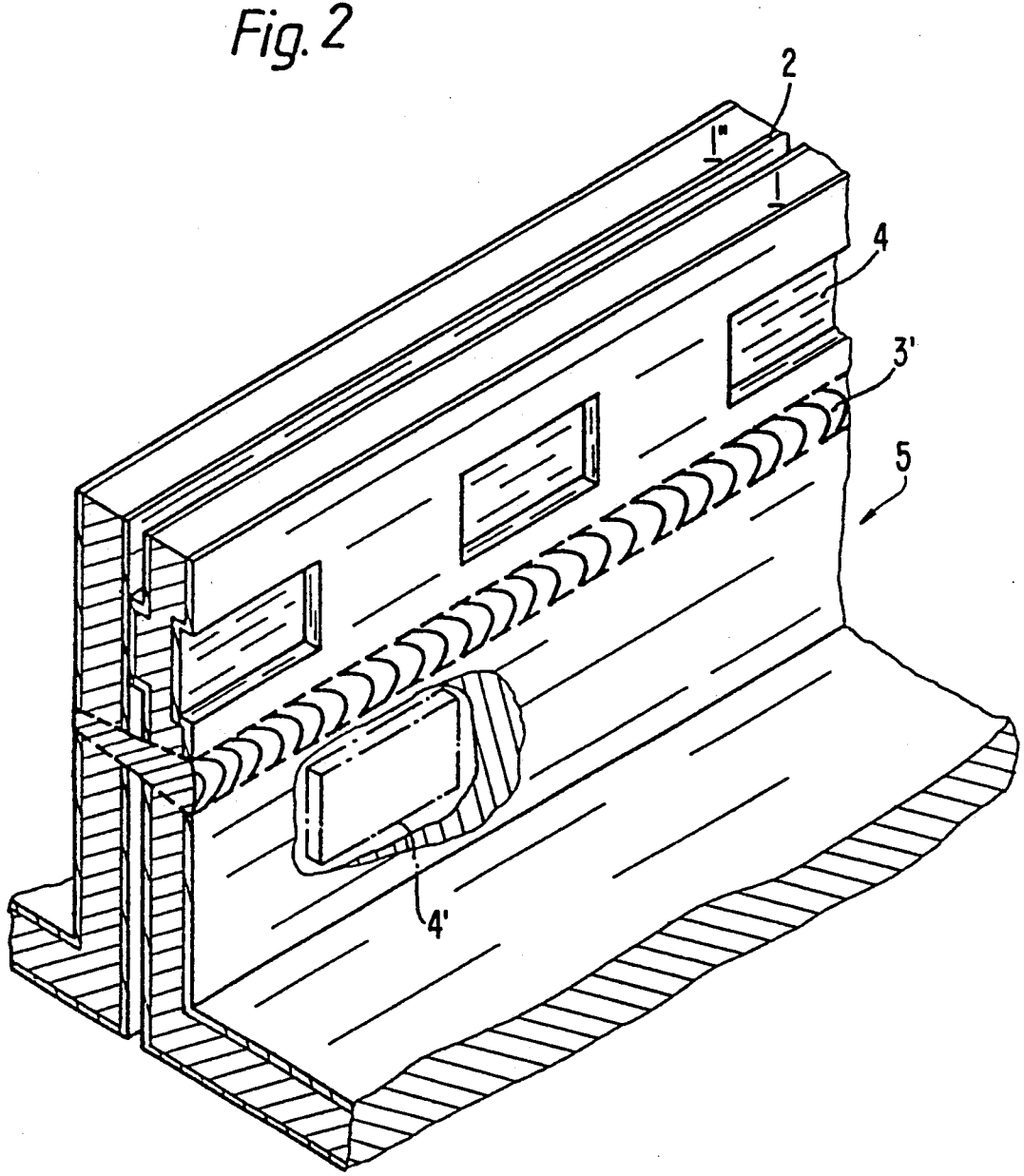
FIG. 2 shows the laser weld between two rows of protrusions.

A further embodiment is depicted in FIG. 2. In this case, each of the two sheets 1, 1" has protrusions 4, 4' arranged along a straight line allocated to a sheet in each case. The protrusions 4, 4' are arranged on either side of and at a distance from a continuous laser weld 3' made between the two straight lines of protrusions 4, 4'. The first protrusions 4 of one sheet 1 are here all made on one side of the weld 3', and the other protrusions 4' of the other sheet 1" are made on the other side. Furthermore, the first protrusions 4 are made in the region opposite the gaps of the second protrusions 4' arranged along the second straight line, which runs on the other longitudinal side of the laser weld 3'. This arrangement facilitates the clamping of the two sheets 1, 1" against one another, since the sheets 1, 1" cannot tilt towards one another in the overlap region 5. In order to achieve the same effect, it is of course also possible to arranged the protrusions both in a staggered manner and on either side of the laser weld in a single sheet.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Welded lap or web joint for galvanized sheets, having a laser weld oriented transversely to an overlap area of said sheets and penetrating through said sheets in said overlap area, said sheets being held at a defined distance apart in said overlap area by a plurality of projecting protrusions disposed on either side of and in proximity to the laser weld, which ensure the distance of the sheets in said overlap area, said protrusions being integrated and pressed into at least one of the sheets, and being arranged on one longitudinal side of said laser weld opposite gaps between adjacent protrusions on an opposite longitudinal side of said laser weld.

2. Method of making a lap or web joint for galvanized sheets comprising the steps of:
   stamping a plurality of protrusions into at least one of said sheets in an area to be welded, said protrusions projecting from said sheet on a side adjacent to another of said sheets to welded;
   moving said sheets into close proximity to one another in the area to be welded, whereby said sheets are maintained at a defined distance apart by said protrusions in the area to be welded; and
   welding said sheets in the area to be welded, said weld penetrating transversely through said sheets, and
   said protrusions being stamped intermittently on either side of said weld.

3. Welded lap or web joint for galvanized sheets, having a laser weld oriented transversely to an overlap area of said sheets and penetrating through said sheets in said overlap area, said sheets being held at a defined distance apart in said overlap area by a plurality of projecting protrusions which are arranged in proximity to the laser weld, said laser weld being disposed intermittently along a straight line with the protrusions and running only in the region between the protrusions, whereby said protrusions ensure the distancing of the sheets in said overlap area, said protrusions being integrated and pressed into at least one of the sheets.

4. Method of making a lap or web joint for galvanized sheets comprising the steps of:

stamping a plurality of protrusions into at least one of said sheets in an area to be welded, said protrusions projecting from said sheet on a side adjacent to another of said sheets to welded;

moving said sheets into close proximity to one another in the area to be welded, whereby said sheets are maintained at a defined distance apart by said protrusions in the area to be welded; and welding said sheets in the area to be welded, said weld penetrating transversely through said sheets, and being made intermittently along a line, with said protrusions being stamped along the same line between said intermittent welds.

* * * * *